(12) United States Patent
Iida (10) Patent No.: US 9,104,264 B2
(45) Date of Patent: Aug. 11, 2015

(54) INFORMATION PROCESSING APPARATUS AND CONTROL METHOD OF INFORMATION PROCESSING APPARATUS

(75) Inventor: Yoshinobu Iida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1163 days.

(21) Appl. No.: 12/842,524

(22) Filed: Jul. 23, 2010

(65) Prior Publication Data

US 2011/0032197 A1    Feb. 10, 2011

(30) Foreign Application Priority Data

Aug. 6, 2009 (JP) .................................. 2009-183894
May 27, 2010 (JP) .................................. 2010-122033

(51) Int. Cl.
    *G06F 3/041* (2006.01)
(52) U.S. Cl.
    CPC .................................. *G06F 3/0418* (2013.01)
(58) Field of Classification Search
    CPC .................................................. G06F 3/041
    USPC .............................................. 345/156–184
    See application file for complete search history.

(56) References Cited

U.S. PATENT DOCUMENTS

| | | | |
|---|---|---|---|
| 6,353,434 B1* | 3/2002 | Akebi et al. | 345/173 |
| 2003/0056999 A1* | 3/2003 | Fukuda | 178/18.02 |
| 2008/0150909 A1* | 6/2008 | North et al. | 345/173 |
| 2009/0109195 A1* | 4/2009 | Kent et al. | 345/178 |

FOREIGN PATENT DOCUMENTS

JP    3959163    8/2007

* cited by examiner

*Primary Examiner* — Dennis Joseph
(74) *Attorney, Agent, or Firm* — Cowan, Liebowitz & Latman, P.C.

(57) ABSTRACT

An information processing apparatus comprises: a calculation unit configured to calculate differences between the display coordinates of the plurality of target touch marks and the coordinates converted by the conversion unit; a correction unit configured to calculate an average value with reference to the center of the display range from the differences calculated by the calculation unit, and to correct, using the average value, the coordinates converted by the conversion unit so that distances between the reference coordinates and the coordinates converted by the conversion unit become equal to each other; and an update unit configured to calculate new conversion coefficients required to correct displacements between the coordinates corrected by the correction unit and the display coordinates of the plurality of target touch marks, and to update the new conversion coefficients as conversion coefficients used in subsequent touch position detection of the touch panel.

12 Claims, 5 Drawing Sheets

- REFERENCE COORDINATES : (0, 0)
- ○ SECOND POSITION INFORMATION : $(X_{2n}, Y_{2n})$
- × TARGET POSITION : $(X_n, Y_n)$
- ---- DIFFERENCE BETWEEN TARGET POSITION AND SECOND POSITION INFORMATION : $(\Delta x_n, \Delta y_n)$
- --- LINE THAT CONNECTS SECOND POSITION INFORMATION

FIG. 4B

- REFERENCE COORDINATES : (0, 0)
- □ THIRD POSITION INFORMATION : $(X_{3n}, Y_{3n})$
- × TARGET POSITION : $(X_n, Y_n)$
- ---- DIFFERENCE BETWEEN TARGET POSITION AND THIRD POSITION INFORMATION
- --- LINE THAT CONNECTS THIRD POSITION INFORMATION

FIG. 5A

- REFERENCE COORDINATES : (0, 0)
- ○ SECOND POSITION INFORMATION : $(X_{2n}, Y_{2n})$
- × TARGET POSITION : $(X_n, Y_n)$
- ---- DIFFERENCE BETWEEN TARGET POSITION AND SECOND POSITION INFORMATION : $(\Delta x_n, \Delta y_n)$
- --- LINE THAT CONNECTS SECOND POSITION INFORMATION

FIG. 5B

- REFERENCE COORDINATES : (0, 0)
- □ THIRD POSITION INFORMATION : $(X_{3n}, Y_{3n})$
- × TARGET POSITION : $(X_n, Y_n)$
- ---- DIFFERENCE BETWEEN TARGET POSITION AND THIRD POSITION INFORMATION
- --- LINE THAT CONNECTS THIRD POSITION INFORMATION

INFORMATION PROCESSING APPARATUS AND CONTROL METHOD OF INFORMATION PROCESSING APPARATUS

BACKGROUND OF THE INVENTION

1. Field of the Invention

The present invention relates to an information processing apparatus, which accepts an input operation from a user, and a control method of the information processing apparatus.

2. Description of the Related Arts

An information processing apparatus, which accepts an input operation from the user, often adopts a resistive film system configured by overlying a touch panel and a display panel (for example, an LCD panel). In general, in order to obtain consistency between the touch panel and display panel, coordinate conversion processing from a coordinate value on the touch panel into that on the display panel is executed. Also, processing for calibrating coefficients used in this coordinate conversion processing (to be also referred to as calibration hereinafter) is generally executed. As a calibration method, the following method is available (for example, Japanese Patent No. 3959163 (reference 1)). That is, in a normal operation mode, an icon which prompts the user to input is displayed on the display panel, and the user touches that icon via the touch panel to calculate calibration coefficients based on the relationship between the coordinate value on the touch panel and that on the display panel.

However, according to this related art, even when the user touches a position largely displaced from the center of the icon, the calibration coefficients may often be unwantedly updated based on a displacement amount from the center of the icon. For this reason, after the calibration coefficients are updated, no operation may be executed although the user touches the center of the icon, or an operation corresponding to an icon that neighbors the icon touched by the user may be executed.

SUMMARY OF THE INVENTION

The present invention has been made in consideration of the above problems, and reduces the influence of any touch error by the user upon calibrating a displacement between a target touch mark displayed on a display panel and an actual touch position on a touch panel.

According to one aspect of the present invention, there is provided an information processing apparatus, which updates conversion coefficients required to correct displacements between display coordinates of a plurality of target touch marks and touch detected coordinates on a touch panel by making a user touch the plurality of target touch marks displayed on a display panel via the touch panel, the apparatus comprising: a display control unit configured to control to display the target touch marks at a plurality of coordinates having equal distances from reference coordinates with reference to a center of a display range on the display panel; a conversion unit configured to convert the touch detected coordinates with respect to the target touch marks into coordinates on the display panel using predetermined conversion coefficients; a calculation unit configured to calculate differences between the display coordinates of the plurality of target touch marks and the coordinates converted by the conversion unit; a correction unit configured to calculate an average value with reference to the center of the display range from the differences calculated by the calculation unit, and to correct, using the average value, the coordinates converted by the conversion unit so that distances between the reference coordinates and the coordinates converted by the conversion unit become equal to each other; and an update unit configured to calculate new conversion coefficients required to correct displacements between the coordinates corrected by the correction unit and the display coordinates of the plurality of target touch marks, and to update the new conversion coefficients as conversion coefficients used in subsequent touch position detection of the touch panel.

According to another aspect of the present invention, there is provided a control method of an information processing apparatus, which updates conversion coefficients required to correct displacements between display coordinates of a plurality of target touch marks and touch detected coordinates on a touch panel by making a user touch the plurality of target touch marks displayed on a display panel via the touch panel, the method comprising: a display control step of controlling a display control unit of the information processing apparatus to control to display the target touch marks at a plurality of coordinates having equal distances from reference coordinates with reference to a center of a display range on the display panel; a conversion step of controlling a conversion unit of the information processing apparatus to convert the touch detected coordinates with respect to the target touch marks into coordinates on the display panel using predetermined conversion coefficients; a calculation step of controlling a calculation unit of the information processing apparatus to calculate differences between the display coordinates of the plurality of target touch marks and the coordinates converted in the conversion step; a correction step of controlling a correction unit of the information processing apparatus to correct, using an average value of the differences calculated in the calculation step, the coordinates converted in the conversion step so that distances between the reference coordinates and the coordinates converted in the conversion step become equal to each other; and an update step of controlling an update unit of the information processing apparatus to calculate new conversion coefficients required to correct displacements between the coordinates corrected in the correction step and the display coordinates of the plurality of target touch marks, and to update the new conversion coefficients as conversion coefficients used in subsequent touch position detection of the touch panel.

The present invention can reduce the influence of any touch error by the user upon calibrating a displacement between a target touch mark displayed on a display panel and an actual touch position on a touch panel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
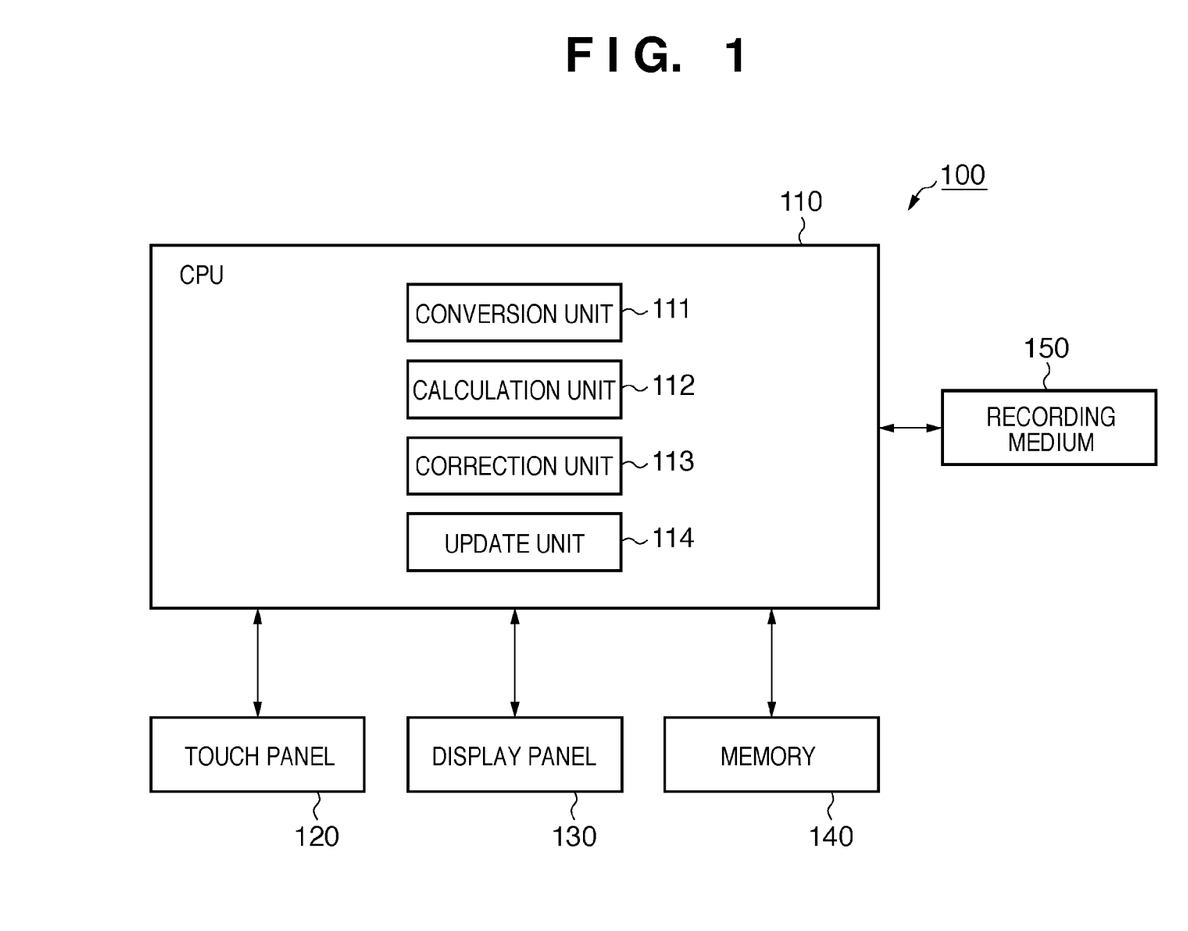
FIG. 1 is a block diagram showing the functional arrangement of an information processing apparatus 100 according to one embodiment.

An embodiment for carrying out the present invention will be described in detail hereinafter with reference to the drawings. FIG. 1 is a block diagram showing the functional arrangement of an information processing apparatus 100 according to one embodiment of the present invention. The information processing apparatus 100 according to the present invention displays a plurality of target touch marks at predetermined coordinates on a display panel 130, and makes the user touch the plurality of displayed target touch marks via a touch panel 120, thereby updating conversion coefficients required to correct displacements between the display coordinates of the plurality of target touch marks and the touch detected coordinates on the touch panel 120. In this embodiment, the information processing apparatus 100 can be applied to, for example, a digital camera that has a touch panel type liquid crystal display on a housing back surface portion.

Figure 2:
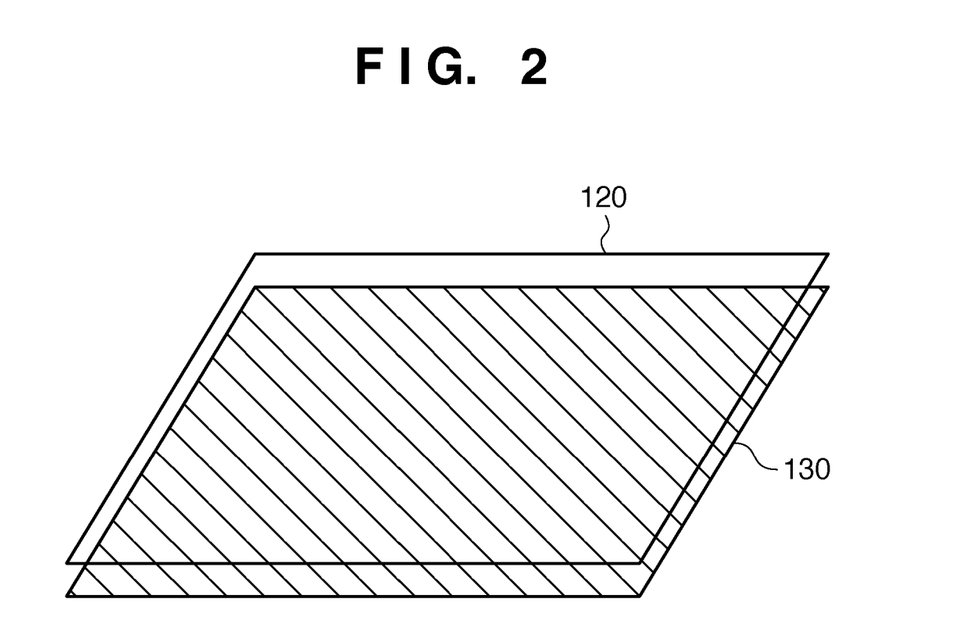
FIG. 2 is a view showing the positional relationship between a touch panel 120 and display panel 130.

The information processing apparatus 100 includes a CPU 110, the touch panel 120, the display panel 130 (for example, an LCD panel), and a memory 140. The touch panel 120 and display panel 130 are configured to be overlaid, as shown in FIG. 2. To the CPU 110, the touch panel 120, display panel 130, and memory 140 are connected. The CPU 110 accepts a user instruction via the touch panel 120, and executes various programs to be described later. The memory 140 is used as a work area of the CPU 110. A recording medium 150 records various programs to be described later.

The CPU 110 functions as a conversion unit 111 which converts touch detected coordinates into coordinates on the display panel 130 using predetermined conversion coefficients, a calculation unit 112 which calculates differences between the display coordinates of the plurality of target touch marks and corresponding coordinates converted by the conversion unit 111, a correction unit 113 which corrects the coordinates converted by the conversion unit 111 using an average value of differences except for a difference, which satisfies a predetermined exceptional condition, of those calculated by the calculation unit 112, and an update unit 114 which calculates new conversion coefficients required to correct displacements between the coordinates corrected by the correction unit 113 and the display coordinates of the plurality of target touch marks, and updates the new conversion coefficients as those used in subsequent touch position detection of the touch panel 120.

Figure 3:
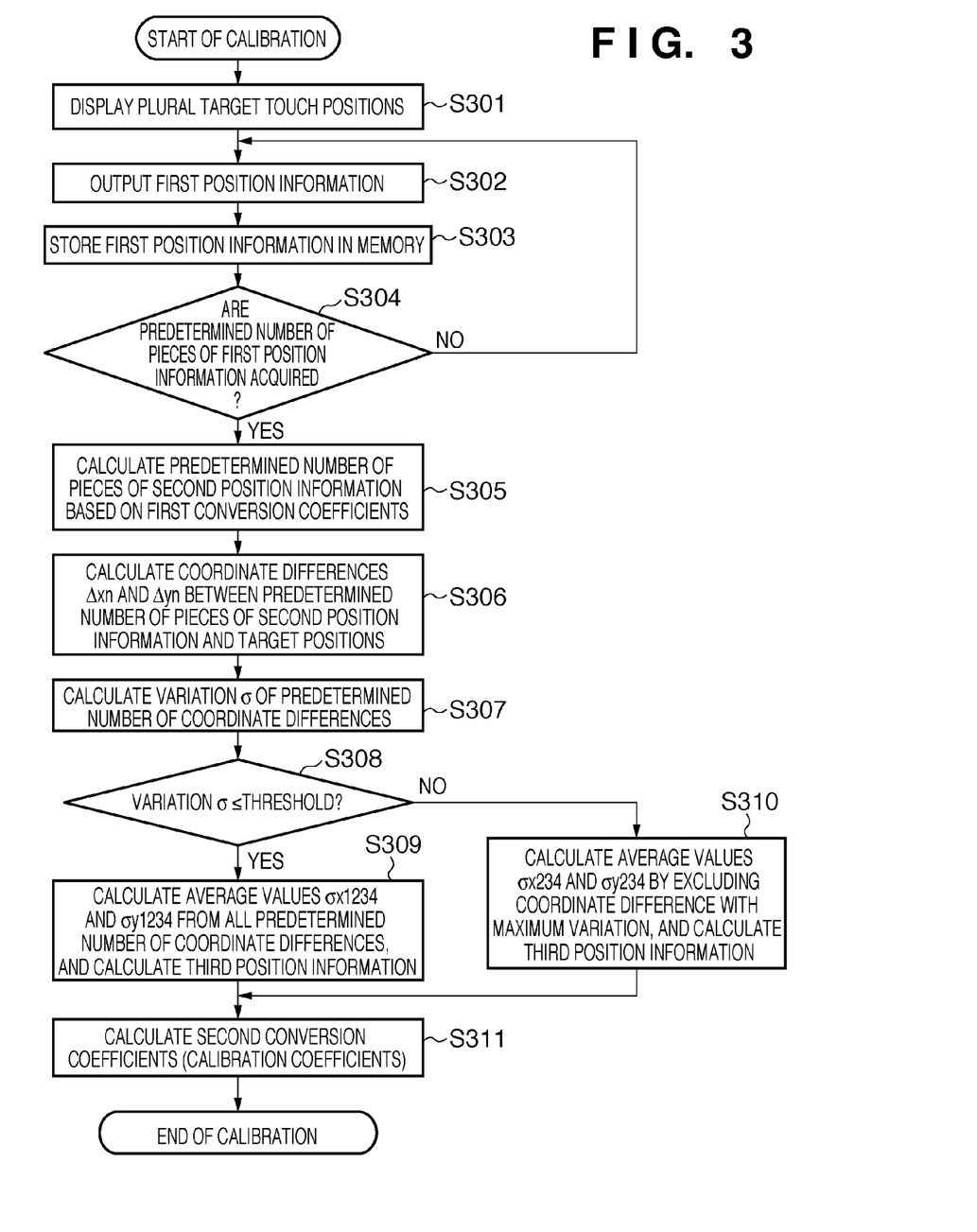
FIG. 3 is a flowchart showing the processing sequence of calibration processing in the information processing apparatus 100.

FIG. 3 is a flowchart showing the processing sequence of calibration processing in the information processing apparatus 100. This calibration processing is implemented when the CPU 110 reads out a program recorded in the recording medium 150 onto the memory 140, and executes the readout program. Upon starting the calibration, the CPU 110 (display control unit) controls to display a plurality of target touch marks on the display panel 130 in step S301. In this embodiment, four target touch marks of n=1 to 4 are displayed at coordinates $(X_n, Y_n)$ on an X-Y coordinate system having the center of a display range as reference coordinates (origin O). Assume that all the coordinates $(X_n, Y_n)$ have equal distances from the origin O. When the user touches one of the plurality of target touch marks, the CPU 110 detects information including a coordinate value of the touch position (first position information) in step S302. In step S303, the CPU 110 stores the detected first position information in the memory 140. The CPU 110 determines in step S304 whether or not pieces of first position information are acquired at all of the plurality of target touch marks. If the target touch marks for which first position information is to be acquired still remain, the process returns to step S301. If the CPU 110 acquires the pieces of first position information at all the target touch marks, the process advances to step S305. In step S305, the CPU 110 calculates pieces of second position information $(X_{2n}, Y_{2n})$ from the pieces of first position information $(x_{1n}, y_{1n})$ corresponding to the plurality of target touch marks, which are stored in the memory 140 in step S303, based on first conversion coefficients (those before the calibration according to this embodiment), which are stored in advance in the memory 140.

Note that first conversion coefficients $a_1$, $b_1$, $c_1$, $d_1$, $e_1$, $f_1$, $g_1$, and $h_1$ are conversion coefficients, which were calculated from differences between pieces of first position information accurately calculated using, for example, a tool at the time of shipping, and the display coordinates of the target touch marks, and operation expressions required to calculate the second position information are described by:

$$X_{2n} = a_1 x_{1n} + b_1 y_{1n} + c_1 x_{1n} y_{1n} + d_1$$

$$Y_{2n} = e_1 x_{1n} + f_1 y_{1n} + g_1 x_{1n} y_{1n} + h_1$$

Figure 4A:
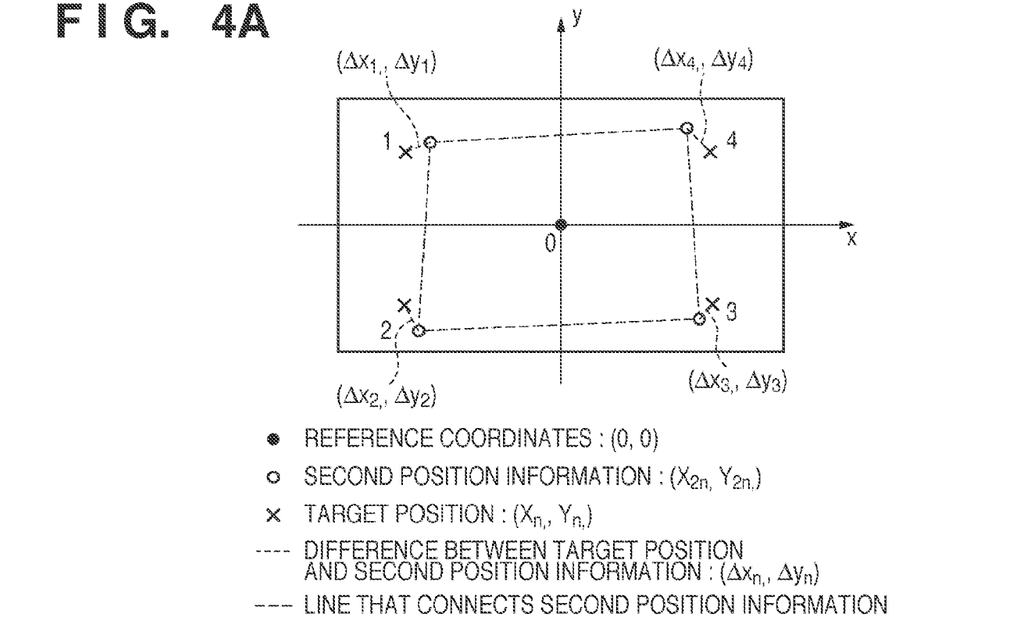
FIGS. 4A and 4B are views showing a state in which second position information is corrected based on an average value of all differences.

In step S306, the CPU 110 calculates differences between the pieces of second position information and the display coordinates $(X_n, Y_n)$ of the target touch marks. More specifically, as shown in FIG. 4A, the CPU 110 calculates differences $(\Delta x_n, \Delta y_n)$ between the display coordinates $(X_n, Y_n)$ of the target touch marks and the pieces of second position information respectively in X and Y directions (X component, Y component) to have the center of a display region of the display panel 130 as the origin O. $(\Delta x_n, \Delta y_n) = (X_{2n} - X_n, Y_{2n} - Y_n)$. That is, the following equations hold.

$$X_{2n} = \Delta x_n + X_n$$

$$Y_{2n} = \Delta y_n + Y_n$$

The differences for n=1 to 4 are enumerated as follows.

$$n=1: (\Delta x_1, \Delta y_1) = (X_{21} - X_1, Y_{21} - Y_1)$$

$$n=2: (\Delta x_2, \Delta y_2) = (X_{22} - X_2, Y_{22} - Y_2)$$

$$n=3: (\Delta X_3, \Delta y_3) = (X_{23} - X_3, Y_{23} - Y_3)$$

$$n=4: (\Delta x_4, \Delta y_4) = (X_{24} - X_4, Y_{24} - Y_4)$$

In step S307, the CPU 110 calculates variations of differences $\Delta 1$ to $\Delta 4$. More specifically, the CPU 110 calculates an average value $\Delta x_{Ave}$ (X average value) in the X direction and an average value $\Delta y_{Ave}$ (Y average value) in the Y direction of the differences $\Delta 1$ to $\Delta 4$ first.

$$\Delta x_{Ave} = (-\Delta x_1 - \Delta x_2 + \Delta x_3 + \Delta x_4)/4$$

$$\Delta y_{Ave} = (\Delta y_1 - \Delta y_2 - \Delta y_3 + \Delta y_4)/4$$

The reason why the above equation includes $-\Delta x_1$ and $-\Delta x_2$ is that regions of n=1 and n=2 are those which meet x<0. In this way, an average value can be calculated in consideration of whether the coordinate $X_{2n}$ is located at a position in a direction closer to or farther from the target touch mark when viewed from x=0 (an x-coordinate of the origin). That is, the average value is calculated with reference to the center of the display range. If $\Delta x_{Ave} < 0$, it is determined that the touch detection position is displaced in a direction to contract in the x direction due to a change in inter-terminal resistance. Conversely, if $\Delta x_{Ave} > 0$, it is determined that the touch detection direction is displaced in a direction to expand in the x direction due to a change in inter-terminal resistance. Likewise, the reason why the above equation includes $-\Delta y_2$ and $-\Delta y_3$ is that regions of n=2 and n=3 are those which meet y<0, and is to calculate an average value in consideration of a direction to contract or expand in the y direction. That is, the average value is calculated with reference to the center of the display range. If $\Delta y_{Ave}<0$, it is determined that the touch detection position is displaced in a direction to contract in the y direction due to a change in inter-terminal resistance. Conversely, if $\Delta y_{Ave}>0$, it is determined that the touch detection direction is displaced in a direction to expand in the y direction due to a change in inter-terminal resistance. Assume that a variation of the differences $\Delta 1$ to $\Delta 4$ is expressed by a distance between the information $(X_{2n}, Y_{2n})$ most deviated from points $(x_{Aven}, y_{Aven})$ displaced from the respective target touch marks $(X_n, Y_n)$ by the average values $\Delta x_{Ave}$ and $\Delta y_{Ave}$, and a corresponding vertex. The points displaced from the respective target touch marks by the average values $\Delta x_{Ave}$ and $\Delta y_{Ave}$ are those that are displaced in directions that consider whether the average values $\Delta x_{Ave}$ and $\Delta y_{Ave}$ are in an expanding or contracting direction. That is, the points $(x_{Aven}, y_{Aven})$ of n=1 to 4 are as follows.

$n=1$: $(x_{Ave1}, y_{Ave1}) = (X_1 - \Delta x_{Ave}, Y_1 + \Delta y_{Ave})$ $n=2$: $(x_{Ave2}, y_{Ave2}) = (X_2 - \Delta x_{Ave}, Y_2 - \Delta y_{Ave})$ $n=3$: $(x_{Ave3}, y_{Ave3}) = (X_3 + \Delta x_{Ave}, Y_3 - \Delta y_{Ave})$ $n=4$: $(x_{Ave4}, y_{Ave4}) = (X_4 + \Delta x_{Ave}, Y_4 + \Delta y_{Ave})$ The information $(X_{2n}, Y_{2n})$ most deviated from points $(x_{Aven}, y_{Aven})$ is that for n which yields a maximum value as the solutions of the following equations. Also, the variation of the differences $\Delta 1$ to $\Delta 4$ is a maximum value of the solutions of the following equations.

$\sigma xy_n = \sqrt{[(X_{2n} - x_{Aven})^2 + (Y_{2n} - y_{Aven})^2]}$

That is, variations $\sigma xy_n$ of n=1 to 4 are as follows.

$n=1$: $\sigma xy_1 = \sqrt{[(X_{21} - x_{Ave1})^2 + (Y_{21} - y_{Ave1})^2]} = \sqrt{[((\Delta x_1 + X_1) - (X_1 - \Delta x_{Ave}))^2 + ((\Delta y_1 + Y_1) - (Y_1 + \Delta y_{Ave}))^2]} = \sqrt{[(\Delta x_1 - (-\Delta x_{Ave}))^2 + (\Delta y_1 - (\Delta y_{Ave}))^2]}$ $n=2$: $\sigma xy_2 = \sqrt{[(X_{22} - x_{Ave2})^2 + (Y_{22} - y_{Ave2})^2]} = \sqrt{[((\Delta x_2 + X_2) - (X_2 - \Delta x_{Ave}))^2 + ((\Delta y_2 + Y_2) - (Y_1 - \Delta y_{Ave}))^2]} = \sqrt{[(\Delta x_2 - (-\Delta x_{Ave}))^2 + (\Delta y_2 - (-\Delta y_{Ave}))^2]}$ $n=3$: $\sigma xy_3 = \sqrt{[(X_{23} - x_{Ave3})^2 + (Y_{23} - y_{Ave3})^2]} = \sqrt{[((\Delta x_3 + X_3) - (X_3 + \Delta x_{Ave}))^2 + ((\Delta y_3 + Y_3) - (Y_3 - \Delta y_{Ave}))^2]} = \sqrt{[(\Delta x_3 - (\Delta x_{Ave}))^2 + (\Delta y_3 - (-\Delta y_{Ave}))^2]}$ $n=4$: $\sigma xy_4 = \sqrt{[(X_{24} - x_{Ave4})^2 + (Y_{24} - y_{Ave4})^2]} = \sqrt{[((\Delta x_4 + X_4) - (X_4 + \Delta x_{Ave}))^2 + ((\Delta y_4 + Y_4) - (Y_4 + \Delta y_{Ave}))^2]} = \sqrt{[(\Delta x_4 - \Delta x_{Ave})^2 + (\Delta y_4 - \Delta y_{Ave})^2]}$ The CPU 110 determines in step S308 whether the calculated variation $\sigma xy$ (a maximum one of $\sigma xy_n$) is less than or equal to less than or equal to a predetermined threshold. If the variation is less than or equal to less than or equal to the threshold, the process advances to step S309; otherwise, the process advances to step S310. In step S309 (when the variation is less than or equal to less than or equal to the threshold), as shown in FIG. 4A, the CPU 110 calculates an average value $\sigma x_{1234}$ in the X direction and an average value $\sigma y_{1234}$ in the Y direction in consideration of the expansion/contraction directions of all the differences $\Delta 1$ to $\Delta 4$ between the four target touch marks and the pieces of information $(X_{2n}, Y_{2n})$ obtained by touching.

$\sigma x_{1234} = (-\Delta x_1 - \Delta x_2 + \Delta x_3 + \Delta x_4)/4$ $\sigma y_{1234} = (\Delta y_1 - \Delta y_2 - \Delta y_3 + \Delta y_4)/4$ Note that $\sigma x_{1234}$ assumes the same value as $\Delta x_{Ave}$, and $\sigma y_{1234}$ assumes the same value as $\Delta y_{Ave}$. Hence, the calculations of these values may be skipped in this step, and the values calculated in step S307 may be diverted. The reason why the above equation includes $-\Delta x_1$ and $-\Delta x_2$ is the same as that upon calculation of $\Delta x_{Ave}$, that is, it is to calculate an average value with reference to the center of the display range. Also, the reason why the above equation includes $-\Delta y_2$ and $-\Delta y_3$ is the same as that upon calculation of $\Delta y_{Ave}$, that is, it is to calculate an average value with reference to the center of the display range.

Figure 4B:
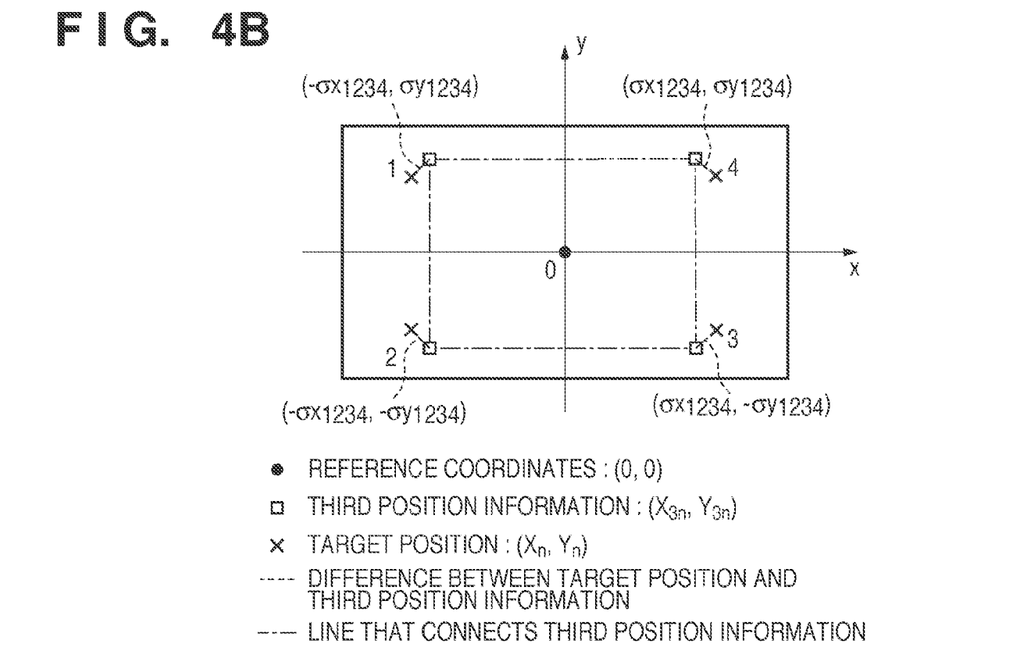

Next, the CPU 110 calculates pieces of third position information 1 to 4 by replacing the differences $\Delta x_1$ to $\Delta x_4$ by the calculated average value $\sigma x_{1234}$ and the differences $\Delta y_1$ to $\Delta y_4$ by the calculated average value $\sigma y_{1234}$, as shown in FIG. 4B. In this case, pieces of third position information $(x_{3n}, y_{3n})$ are calculated using:

$n=1$: $(x_{31}, y_{31}) = (X_1 - \sigma x_{1234}, Y_1 + \sigma y_{1234})$ $n=2$: $(x_{32}, y_{32}) = (X_2 - \sigma x_{1234}, Y_2 - \sigma y_{1234})$ $n=3$: $(x_{33}, y_{33}) = (X_3 + \sigma x_{1234}, Y_3 - \sigma y_{1234})$ $n=4$: $(x_{34}, y_{34}) = (X_4 + \sigma x_{1234}, Y_4 + \sigma y_{1234})$ When the target touch positions are displayed at positions forming vertices of a rectangle, as shown in FIG. 4B, these pieces of third position information 1 to 4 correspond to positions that form vertices of a rectangle free from any distortion, as shown in FIG. 4B. These pieces of information $(x_{3n}, y_{3n})$ of n=1 to 4 have equal distances from the center of the display region. When the user correctly touches an apparent target touch position, the coordinate position of the detected second position information may often have a displacement from the display coordinate position of that target touch mark due to a displacement of the detection position caused by aging or a temperature change. However, as will be described later, since it is determined that the detection position is to be evenly displaced in the expanding or contracting direction due to aging or a temperature change, the second position information is corrected to the third position information which has an equal distance from the center of the display region, and calibration from step S311 is then executed.

Figure 5A:
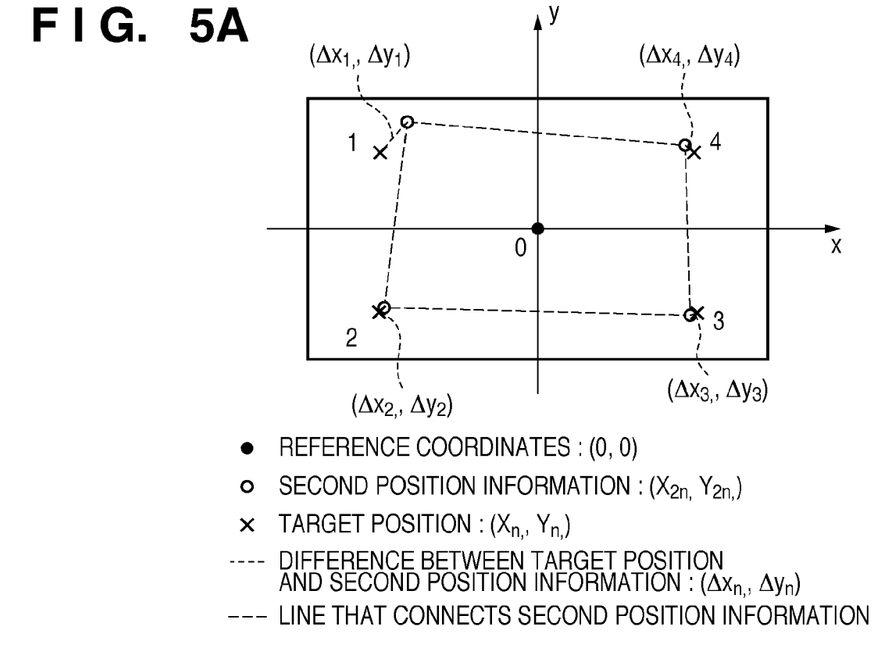
FIGS. 5A and 5B are views showing a state in which second position information is corrected based on an average value of differences except for a maximum difference.

On the other hand, in step S310 (when the variation $\sigma xy$ is larger than the threshold), the CPU 110 calculates average values of the differences except for a difference associated with n whose $\sigma xy_n$ is larger than the threshold. When there are a plurality of differences larger than the threshold, a predetermined number of differences are excluded so that the number of differences which are not excluded is three or more. In this example, since there are four target touch positions, if there are a plurality of differences larger than the threshold, only the largest difference is excluded. For example, as shown in FIG. 5A, assume that the differences $\Delta x_1$ and $\Delta y_1$ are largely different from other differences $\Delta x_2$ to $\Delta x_4$ and $\Delta y_2$ to $\Delta y_4$. In this case, values most deviated from the values $\Delta x_{Ave}$ and $\Delta y_{Ave}$ (in this case, $\Delta x_1$ and $\Delta y_1$) are excluded, and only the differences $\Delta x_2$ to $\Delta x_4$ and $\Delta y_2$ to $\Delta y_4$ are averaged in consideration of the expanding/contracting directions, thus calculating an average value $\sigma x_{234}$ in the X direction and an average value $\sigma y_{234}$ in the Y direction.

$\sigma x_{234} = (-\Delta x_2 + \Delta x_3 + \Delta x_4)/3$ $\sigma y_{234} = (-\Delta y_2 - \Delta y_3 + \Delta y_4)/3$ Note that the reason why the equation includes $-\Delta x_2$ is the same as that upon calculation of $\Delta x_{Aver}$, that is, it is to calculate an average value with reference to the center of the display range. Also, the reason why the equation includes $-\Delta y_2$ and $-\Delta y_3$ is the same as that upon calculation of $\Delta y_{Ave}$, that is, it is to calculate an average value with reference to the center of the display range.

Then, the CPU 110 calculates pieces of third position information 1 to 4 by replacing the differences $\Delta x_1$ to $\Delta x_4$ by the calculated average value $\sigma x_{234}$ and the differences $\Delta y_1$ to $\Delta y_4$ by the calculated average value $\sigma y_{234}$.

In this case, pieces of third position information $(x_{3n}, y_{3n})$ are calculated using:

$$n=1: (x_{31}, y_{31}) = (X_1 - \sigma x_{234}, Y_1 + \sigma y_{234})$$

$$n=2: (x_{32}, y_{32}) = (X_2 - \sigma x_{234}, Y_2 - \sigma y_{234})$$

$$n=3: (x_{33}, y_{33}) = (X_3 + \sigma x_{234}, Y_3 - \sigma y_{234})$$

$$n=4: (x_{34}, y_{34}) = (X_4 + \sigma x_{234}, Y_4 + \sigma y_{234})$$

Figure 5B:
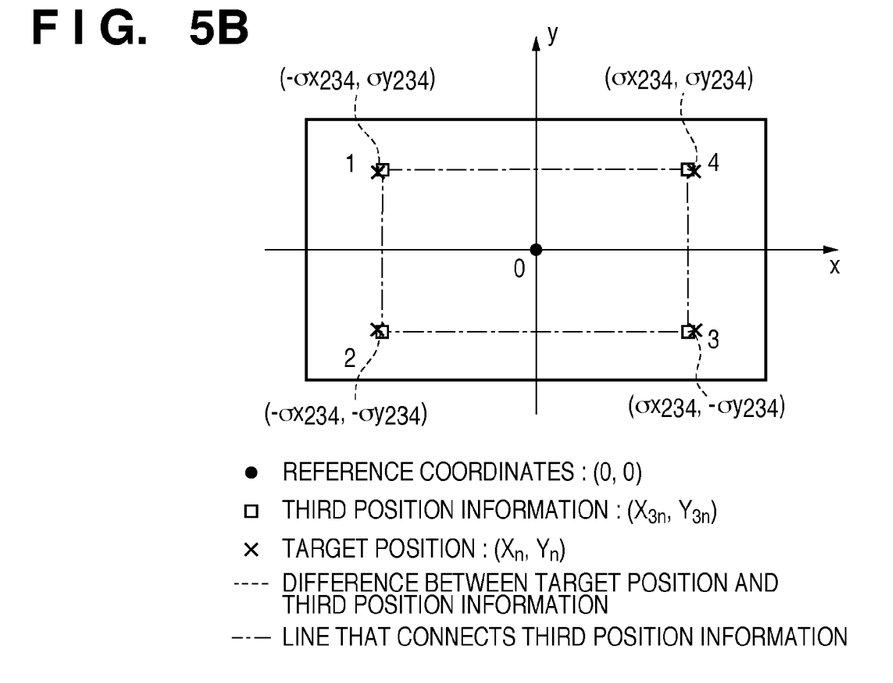

When the target touch positions are displayed at positions forming vertices of a rectangle, as shown in FIG. 5B, these pieces of third position information 1 to 4 correspond to positions that form vertices of a rectangle free from any distortion, as shown in FIG. 5B. These pieces of information $(x_{3n}, y_{3n})$ of n=1 to 4 have equal distances from the center of the display region. Even when the user correctly touches one of apparent target touch positions of n=2 to 4, the coordinate position of the detected second position information may often have a displacement from the display coordinate position of that target touch mark due to a displacement of the detection position caused by aging or a temperature change. However, as will be described later, since it is determined that the detection position is to be evenly displaced in the enlarging or contracting direction due to aging or a temperature change, the second position information is corrected to the third position information which has an equal distance from the center of the display region, and calibration from step S311 is then executed. In step S311, the CPU 110 calculates second conversion coefficients $a_2, b_2, c_2, d_2, e_2, f_2, g_2$, and $h_2$ (calibration coefficients) based on the pieces of corrected third position information. A method of calculating the second conversion coefficients will be described below. Based on the display coordinates $(X_n, Y_n)$ of the target touch marks and the pieces of third position information $(x_{3n}, y_{3n})$, the second conversion coefficients are calculated by:

$$a_2 = A_1 / A_2$$

$$b_2 = B / A_2$$

$$c_2 = C / A_2$$

$$d_2 = X_3 - a_2 x_{31} - b_2 y_{31} - c_2 x_{31} y_{31} e_2$$

$$= E_1 / E_2$$

$$f_2 = F / E_2$$

$$g_2 = G / E_2$$

$$h_2 = Y_3 - e_2 x_{31} - f_2 y_{31} - g_2 x_{31} y_{31}$$

where $A_1, A_2, B, C, E_1, E_2, F$, and $G$ are calculated as follows:

$$A_1 = (X_2 - X_4)\{(y_{31} - y_{32})(x_{33}y_{33} - x_{34}y_{34}) - (y_{33} - y_{34})(x_{31}y_{31} - x_{32}y_{32})\}$$

$$A_2 = (x_{31} - x_{32})\{(y_{32} - y_{33})(x_{33}y_{33} - x_{34}y_{34}) - (y_{33} - y_{34})(x_{32}y_{32} - x_{33}y_{33})\} + (x_{33} - x_{32})\{(y_{31} - y_{32})(x_{33}y_{33} - x_{34}y_{34}) - (y_{33} - y_{34})(x_{31}y_{31} - x_{32}y_{32})\} + (x_{33} - x_{34})\{(y_{31} - y_{32})(x_{32}y_{32} - x_{33}y_{33}) - (y_{32} - y_{33})(x_{31}y_{31} - x_{32}y_{32})\}$$

$$B = (X_3 - X_1)\{(x_{31} - x_{32})(x_{33}y_{33} - x_{34}y_{34}) - (x_{33} - x_{34})(x_{31}y_{31} - x_{32}y_{32})\}$$

$$C = (X_2 - X_4)\{(x_{31} - x_{32})(y_{33} - y_{34}) - (x_{33} - x_{34})(y_{31} - y_{32})\}$$

$$E_1 = (Y_2 - Y_4)\{(y_{32} - y_{33})(x_{34}y_{34} - x_{31}y_{31}) - (y_{34} - y_{31})(x_{32}y_{32} - x_{33}y_{33})\}$$

$$E_2 = (x_{31} - x_{32})\{(y_{32} - y_{33})(x_{34}y_{34} - x_{31}y_{31}) - (y_{34} - y_{31})(x_{32}y_{32} - x_{33}y_{33})\} + (x_{33} - x_{32})\{(y_{31} - y_{32})(x_{34}y_{34} - x_{31}y_{31}) - (y_{34} - y_{31})(x_{31}y_{31} - x_{32}y_{32})\} + (x_{34} - x_{31})\{(y_{31} - y_{32})(x_{32}y_{32} - x_{33}y_{33}) - (y_{32} - y_{33})(x_{31}y_{31} - x_{32}y_{32})\}$$

$$F = (Y_3 - Y_1)\{(x_{32} - x_{33})(x_{34}y_{34} - x_{31}y_{31}) - (x_{34} - x_{31})(x_{32}y_{32} - x_{33}y_{33})\}$$

$$G = (Y_2 - Y_4)\{(x_{32} - x_{33})(y_{34} - y_{31}) - (x_{34} - x_{31})(y_{32} - y_{33})\}$$

Then, the calculated second conversion coefficients ($a_2, b_2, c_2, d_2, e_2, f_2, g_2$, and $h_2$) are updated, thus ending the calibration.

In this case, the second conversion coefficients are used as operation expressions required to correct positional displacements between the touch panel coordinates and display panel coordinates in a normal operation mode. More specifically, the positional displacement is converted by calculating LCD coordinates $(X_{LCD-n}, Y_{LCD-n})$ by inputting touch panel coordinates $(x_{touch-n}, y_{touch-n})$ into:

$$X_{LCD-n} = a_2 x_{touch-n} + b_2 y_{touch-n} + c_2 x_{touch-n} y_{touch-n} + d_2$$

$$Y_{LCD-n} = e_2 x_{touch-n} + f_2 y_{touch-n} + g_2 x_{touch-n} y_{touch-n} + h_2$$

The reason why the correction is made to obtain the same differences by averaging the differences between the target touch marks and the pieces of information $(X_{2n}, Y_{2n})$ obtained by touching in consideration of the expanding/contracting directions (so as to obtain equal distances from the center of the display region) will be described below. Causes that require the calibration of the touch panel are roughly classified into the following three causes.

The first cause is a displacement upon adhering the touch panel 120 and display panel 130. The displacement upon adhering displaces positions in various directions including rotation and translation directions.

The second cause is a displacement due to linearity caused by the properties of a transparent conductive film (for example, an ITO film) of the touch panel 120. The displacement due to linearity nonlinearly displaces positions. The displacement due to linearity depends on uniformity of the transparent conductive film in the touch panel 120, and is caused by a nonlinear relationship between the touch position and output voltage value.

The third cause is a displacement due to a change in inter-terminal resistance of the touch panel 120. The displacement due to a change in inter-terminal resistance displaces positions in one of the expanding and contracting directions.

Of these three causes, once displacements due to adhesion and linearity have undergone position correction in, for example, the factory, they will rarely change after that. On the other hand, as is known, a displacement due to a change in inter-terminal resistance largely changes due to aging or a temperature change after shipping. Therefore, position information using the first conversion coefficients obtained after precise adjustment using a tool in, for example, the factory suffers only a displacement due to a change in inter-terminal resistance. That is, the position information using the first conversion coefficients ought to be displaced in either the expanding or contracting direction.

However, as described above, even the position information using the first conversion coefficients is often displaced in a nonlinear direction other than the expanding or contracting direction compared to a target touch mark due to a displacement of the touch position by the user. A calibration precision drop due to variations of the user's touch position can be prevented to some extent by applying correction for averaging differences of the pieces of position information using the first conversion coefficients to be equal to each other in consideration of the expanding/contracting directions (that is, applying correction by averaging differences to have equal distances from the center of the display region). Also, a calibration precision drop due to a large displacement by a user's touch error of the user's touch position displacements can be prevented to some extent by excluding position information having a displacement exceeding a threshold from those using the first conversion coefficients, as described in this embodiment.

<Practical Numerical Value Example: Case of Variation ≤Threshold>

The processes described in steps S308 to S310 in FIG. 3 will be described by applying practical numerical values. A practical example of a case in which it is determined in step S308 that the variation is less than or equal to the threshold (case of performing the process in step S309) will be described first.

Assume that the display coordinates of the target touch marks have the following coordinate values.

$(X_1, Y_1) = (-80, +80)$ $(X_2, Y_2) = (-80, -80)$ $(X_3, Y_3) = (+80, -80)$ $(X_4, Y_4) = (+80, +80)$

Also, assume that the pieces of second position information indicate the following coordinate values.

$(X_{21}, Y_{21}) = (-72, +83)$ $(X_{22}, Y_{22}) = (-74, -91)$ $(X_{23}, Y_{23}) = (+74, -85)$ $(X_{24}, Y_{24}) = (+68, +89)$

The differences $(\Delta x_n, \Delta y_n)$ between the display coordinates $(X_n, Y_n)$ of the target touch marks and the pieces of second position information $(X_{2n}, Y_{2n})$ are as follows.

$n=1: (\Delta x_1, \Delta y_1) = (X_{21}-X_1, Y_{21}-Y_1) = (-72+80, 83-80) = (8, 3)$ $n=2: (\Delta x_2, \Delta y_2) = (X_{22}-X_2, Y_{22}-Y_2) = (-74+80, -91+80) = (6, -11)$ $n=3: (\Delta x_3, \Delta y_3) = (X_{23}-X_3, Y_{23}-Y_3) = (74-80, -85+80) = (-6, -5)$ $n=4: (\Delta x_4, \Delta y_4) = (X_{24}-X_4, Y_{24}-Y_4) = (68-80, 89-80) = (-12, 9)$ Next, the average values $(\Delta x_{Ave}, \Delta y_{Ave})$ of the differences $(\Delta x_n, \Delta y_n)$ are calculates as follows.

$\Delta x_{Ave} = (-\Delta x_1 - \Delta x_2 + \Delta x_3 + \Delta x_4)/4 = (-8-6+(-6)+(-12))/4 = -8$ $\Delta y_{Ave} = (\Delta y_1 - \Delta y_2 - \Delta y_3 + \Delta y_4)/4 = (+3-(-11)-(-5)+9)/4 = +7$ That is, it can be regarded that the touch detection position is displaced in the contracting direction in the x direction and in the expanding direction in the y direction. Therefore, points $(x_{Aven}, y_{Aven})$ of n=1 to 4 are as follows.

$n=1: (x_{Ave1}, y_{Ave1}) = (X_1 - \Delta x_{Ave}, Y_1 + \Delta y_{Ave}) = (-80+8, 80+7) = (-72, 87)$ $n=2: (x_{Ave2}, y_{Ave2}) = (X_2 - \Delta x_{Ave}, Y_2 - \Delta y_{Ave}) = (-80+8, -80-7) = (-72, -87)$ $n=3: (x_{Ave3}, y_{Ave3}) = (X_3 + \Delta x_{Ave}, Y_3 - \Delta y_{Ave}) = (80-8, -80-7) = (72, -87)$ $n=4: (x_{Ave4}, y_{Ave4}) = (X_4 + \Delta x_{Ave}, Y_4 + \Delta y_{Ave}) = (80-8, 80+7) = (72, -87)$ Next, the second position information $(X_{2n}, Y_{2n})$ most deviated from the points $(x_{Aven}, y_{Aven})$ is calculated. Variations given by:

$\sigma xy_n = \sqrt{[(X_{2n} - x_{Aven})^2 + (Y_{2n} - y_{Aven})^2]}$ respectively assume the following numerical values:

$n=1: \sigma xy_1 = \sqrt{[(X_{21} - x_{Ave1})^2 + (Y_{21} - y_{Ave1})^2]} = \sqrt{[(-72+72)^2 + (83-87)^2]} = \sqrt{16}$ $n=2: \sigma xy_2 = \sqrt{[(X_{22} - x_{Ave2})^2 + (Y_{22} - y_{Ave2})^2]} = \sqrt{[(-74+72)^2 + (-91+87)^2]} = \sqrt{20}$ $n=3: \sigma xy_3 = \sqrt{[(X_{23} - x_{Ave3})^2 + (Y_{23} - y_{Ave3})^2]} = \sqrt{[(74-72)^2 + (-85+87)^2]} = \sqrt{8}$ $n=4: \sigma xy_4 = \sqrt{[(X_{24} - x_{Ave4})^2 + (Y_{24} - y_{Ave4})^2]} = \sqrt{[(68-72)^2 + (89-87)^2]} = \sqrt{20}$ Therefore, the variation $\sigma xy = \sqrt{20}$. The CPU 110 determines in step S308 if the calculated variation $\sigma xy$ (a maximum one of $\sigma xy_n$: $\sqrt{20}$ in this example) is less than or equal to the predetermined threshold=10 ($=\sqrt{100}$). In this case, since the variation=$\sqrt{20}$ is less than or equal to the threshold=10, the process advances to step S309. In step S309, the CPU 110 calculates an average value $\sigma x_{1234}$ in the X direction and average value $\sigma y_{1234}$ in the Y direction in consideration of the expanding/contracting directions of all the differences $\Delta 1$ to $\Delta 4$ between the four target touch marks and the pieces of information $(X_{2n}, Y_{2n})$ obtained by touching, as shown in FIG. 4A.

$\sigma x_{1234} = (-8-6-6-12)/4 = -8$ $\sigma y_{1234} = (3+11+5+9)/4 = 7$

Therefore, the pieces of third position information $(x_{3n}, y_{3n})$ assume the following values:

$n=1: (x_{31}, y_{31}) = (X_1 - \sigma x_{1234}, Y_1 + \sigma y_{1234}) = (-80+8, 80+7) = (-72, 87)$ $n=2: (x_{32}, y_{32}) = (X_2 - \sigma x_{1234}, Y_2 - \sigma y_{1234}) = (-80+8, -80-7) = (-72, -87)$ $n=3: (x_{33}, y_{33}) = (X_3 + \sigma x_{1234}, Y_3 - \sigma y_{1234}) = (80-8, 80+7) = (72, -87)$ $n=4: (x_{34}, y_{34}) = (X_4 + \sigma x_{1234}, Y_4 + \sigma y_{1234}) = (80-8, 80+7) = (72, 87)$ In this manner, four points indicated by the pieces of third position information $(x_{3n}, y_{3n})$ assume values, which have equal distances from the origin O (the center of the display region) and form vertices of a rectangle free from any distortion. This rectangle is obtained by contracting the rectangle defined by the four points of the target touch marks by "8" in the x direction and expanding it by "7" in the y direction. From step S311, the second conversion coefficients (calibration coefficients) are calculated based on the pieces of third position information calculated in this way, and the calibration is executed. A description of a practical example of numerical values of this processing will not be given. That is, in this example, it is determined that there are no large user's touch errors for the pieces of second position information of n=1 to 4 acquired by user's touching. It is then determined that all the obtained touch positions of n=1 to 4 are displaced due to aging or a temperature change by "8" in contracting direction in the x direction and by "7" in the expanding direction in the y direction, and are calibrated from step S311.

<Practical Numerical Value Example: Case of Variation >Threshold>

A practical example of a case in which it is determined in step S308 that the variation exceeds the threshold (the case in which the processing in step S310 is executed) will be described below.

Assume that the display coordinates of the target touch marks have the following coordinate values.

$$(X_1, Y_1) = (-80, +80)$$

$$(X_2, Y_2) = (-80, -80)$$

$$(X_3, Y_3) = (+80, -80)$$

$$(X_4, Y_4) = (+80, +80)$$

Also, assume that the pieces of second position information indicate the following coordinate values.

$$(X_{21}, Y_{21}) = (-68, +92)$$

$$(X_{22}, Y_{22}) = (-79, -79)$$

$$(X_{23}, Y_{23}) = (+79, -81)$$

$$(X_{24}, Y_{24}) = (+76, +84)$$

The differences $(\Delta x_n, \Delta y_n)$ between the display coordinates $(X_n, Y_n)$ of the target touch marks and the pieces of second position information $(X_{2n}, Y_{2n})$ are as follows.

$$n=1: (\Delta x_1, \Delta y_1) = (X_{21}-X_1, Y_{21}-Y_1) = (-68+80, 92-80) = (12,12)$$

$$n=2: (\Delta x_2, \Delta y_2) = (X_{22}-X_2, Y_{22}-Y_2) = (-79+80, -79+80) = (1,1)$$

$$n=3: (\Delta x_3, \Delta y_3) = (X_{23}-X_3, Y_{23}-Y_3) = (79-80, -81+80) = (-1,-1)$$

$$n=4: (\Delta x_4, \Delta y_4) = (X_{24}-X_4, Y_{24}-Y_4) = (76-80, 84-80) = (-4,4)$$

Next, the average values $(\Delta x_{Ave}, \Delta y_{Ave})$ of the differences $(\Delta x_n, \Delta y_n)$ are calculates as follows.

$$\Delta x_{Ave} = (-\Delta x_1 - \Delta x_2 + \Delta x_3 + \Delta x_4)/4 = (-12-1+(-1)+(-4))/4 = -4.5$$

$$\Delta y_{Ave} = (\Delta y_1 - \Delta y_2 - \Delta y_3 + \Delta y_4)/4 = (12-1-(-1)+4)/4 = +4$$

Therefore, points $(x_{Aven}, y_{Aven})$ 1 of n=1 to 4 are as follows.

$$n=1: (x_{Ave1}, y_{Ave1}) = (X_1 - \Delta x_{Ave}, Y_1 + \Delta y_{Ave}) = (-80+4.5, 80+4) = (-75.5, 84)$$

$$n=2: (x_{Ave2}, y_{Ave2}) = (X_2 - \Delta x_{Ave}, Y_2 - \Delta y_{Ave}) = (-80+4.5, -80-4) = (-75.5, -84)$$

$$n=3: (x_{Ave3}, y_{Ave3}) = (X_3 + \Delta x_{Ave}, Y_3 - \Delta y_{Ave}) = (80-4.5, -80-4) = (75.5, -84)$$

$$n=4: (x_{Ave4}, y_{Ave4}) = (X_4 + \Delta x_{Ave}, Y_4 + \Delta y_{Ave}) = (80-4.5, 80+4) = (75.5, 84)$$

Next, the second information $(X_{2n}, Y_{2n})$ most deviated from the points $(x_{Aven}, y_{Aven})$ is calculated. Variations given by:

$$\sigma xy_n = \sqrt{[(X_{2n}-x_{Aven})^2 + (Y_{2n}-y_{Aven})^2]}$$

respectively assume the following numerical values:

$$n=1: \sigma xy_1 = \sqrt{[(X_{21}-x_{Ave1})^2 + (Y_{21}-y_{Ave2})^2]} = \sqrt{[(-68+75.5)^2 + (92-84)^2]} = \sqrt{120.25}$$

$$n=2: \sigma xy_2 = \sqrt{[(X_{22}-x_{Ave2})^2 + (Y_{22}-y_{Ave2})^2]} = \sqrt{[(-79+75.5)^2 + (-79+84)^2]} = \sqrt{37.25}$$

$$n=3: \sigma xy_3 = \sqrt{[(X_{23}-x_{Ave3})^2 + (Y_{23}-y_{Ave3})^2]} = \sqrt{[(79-75.5)^2 + (-81+84)^2]} = \sqrt{21.25}$$

$$n=4: \sigma xy_4 = \sqrt{[(X_{24}-x_{Ave4})^2 + (Y_{24}-y_{Ave4})^2]} = \sqrt{[(76-75.5)^2 + (84-84)^2]} = \sqrt{0.25}$$

Therefore, the variation $\sigma xy = \sqrt{120.25}$. The CPU 110 determines in step S308 if the calculated variation $\sigma xy$ (a maximum one of $\sigma xy_n$: $\sqrt{120.25}$ in this example) is less than or equal to the predetermined threshold=10 ($=\sqrt{100}$). In this case, since the variation=$\sqrt{120.25}$ exceeds the threshold=10, the process advances to step S310. In step S310, the CPU 110 calculates an average value $\sigma x_{234}$ in the X direction and average value $\sigma y_{234}$ in the Y direction by excluding the difference $(\Delta x_1, \Delta y_1)$ of n whose $\sigma xy_n$ is larger than the threshold, and averaging only the remaining differences $\Delta x_2$ to $\Delta x_4$ and $\Delta y_2$ to $\Delta y_4$ in consideration of the expanding/contracting directions.

$$\sigma x_{234} = (-\Delta x_2 + \Delta x_3 + \Delta x_4)/3 = (-1+(-1)+(-4))/3 = 2$$

$$\sigma y_{234} = (-\Delta y_2 - \Delta y_3 + \Delta y_4)/3 = (-1-(-1)+4)/3 = 4/3$$

In this example, since both the average value $\sigma x_{234}$ in the X direction and the average value $\sigma y_{234}$ in the Y direction, which are calculated by excluding one point associated with n=1 assume positive values, it can be regarded that the touch detection positions are displaced in the expanding direction in both the x and y directions. Therefore, the pieces of third position information $(x_{3n}, y_{3n})$ assume the following values:

$$n=1: (x_{31}, y_{31}) = (X_1 - \sigma x_{234}, Y_1 + \sigma y_{234}) = (-80+2, 80+4/3) = (-78, 80+4/3)$$

$$n=2: (x_{32}, y_{32}) = (X_2 - \sigma x_{234}, Y_2 - \sigma x_{234}) = (-80+2, -80-4/3) = (-78, -(80+4/3))$$

$$n=3: (x_{33}, y_{33}) = (X_3 + \sigma x_{234}, Y_3 - \sigma y_{234}) = (80-2, -80-4/3) = (78, -(80+4/3))$$

$$n=4: (x_{34}, y_{34}) = (X_4 + \sigma x_{234}, Y_4 + \sigma y_{234}) = (80-2, 80+4/3) = (78, 80+4/3)$$

In this manner, four points indicated by the pieces of third position information $(x_{3n}, y_{3n})$ assume values, which have equal distances from the origin O (the center of the display region) and form vertices of a rectangle free from any distortion. This rectangle is obtained by expanding the rectangle defined by the four points of the target touch marks by "2" in the x direction and "4/3" in the y direction. From step S311, the second conversion coefficients (calibration coefficients) are calculated based on the pieces of third position information calculated in this way, and the calibration is executed. A description of a practical example of numerical values of this processing will not be given. That is, in this example, it is determined that the displacement of the second position information of n=1 acquired by user's touching is not that of the touch detection position caused by aging or a temperature change but it is a user's touch error, and that information is excluded. Then, it is determined that the obtained remaining touch positions of n=2 to 4 are displaced by "2" in the x direction and "4/3" in the y direction in the expanding direction due to aging or a temperature change, and are calibrated from step S311.

Note that the first embodiment has been described under the assumption that the user is prompted to touch the four target touch marks. However, if the user is prompted to touch at least three points, a touch error can be excluded by the same operation sequence, and a troublesome calibration operation by the user can be eliminated. If five or more target touch marks are used, even when the user touches displaced positions, two points can be excluded, thus improving the calibration precision. In either case, the plurality of target touch marks are displayed at coordinates having equal distances from the center of the display range.

As described above, since the calibration coefficients are calculated after pieces of position information calculated based on the conversion coefficients, which have been precisely adjusted using, for example, a tool, are corrected, even when the user touches a position displaced from the target touch mark, the calibration coefficients from which deterioration of precision due to this cause can be excluded or eliminated can be calculated.

Therefore, the calibration precision can be improved. As a result, even when the inter-terminal resistances of the touch panel have changed due to aging or a temperature change, and the touch panel coordinates have displaced from the display panel coordinates, troubles in that no operation is executed although the user touches the center of an icon or an operation corresponding to a neighboring icon is unwantedly executed can be avoided.

Note that the correction unit 113 may adopt an arrangement which simply corrects coordinate values converted by the conversion unit 111 based on an average value of differences except for at least a maximum difference of the calculated differences without calculating any variations. Alternatively, the correction unit 113 may adopt an arrangement which corrects coordinate values converted by the conversion unit 111 based on an average value of differences except for a difference larger than the predetermined threshold of those which are calculated by the calculation unit 112.

The present invention has been described in detail by way of the preferred embodiments thereof. However, the present invention is not limited to these specific embodiments, and includes various embodiments within the scope without departing from the gist of the present invention. Some of the aforementioned embodiments may be combined as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-183894, filed Aug. 6, 2009 and 2010-122033, filed May 27, 2010, which are hereby incorporated by reference herein in their entirety.

What is claimed is:

1. An information processing apparatus, which updates conversion coefficients required to correct displacements between display coordinates of a plurality of target touch marks and a plurality of touch detected coordinates on a touch panel, each touch detected coordinate corresponding to a different target touch mark and resulting from making a user touch the corresponding target touch mark displayed on a display panel via the touch panel, the apparatus comprising:
   a display control unit configured to control to display the target touch marks at a plurality of coordinates having equal distances from reference coordinates with reference to a center of a display range on the display panel;
   a conversion unit configured to convert the plurality of touch detected coordinates each corresponding to a different one of the plurality of target touch marks into converted coordinates on the display panel using predetermined conversion coefficients, each converted coordinate corresponding to a different one of the plurality of target touch marks;
   a calculation unit configured to calculate for each of the display coordinates of the plurality of touch marks a difference between the display coordinate of that target touch mark and the converted coordinate corresponding to the same touch mark;
   a correction unit configured to calculate an average value with reference to the center of the display range from at least a plurality of the differences calculated by the calculation unit, and to correct, using the average value, each of the converted coordinates to generate for each converted coordinate a corrected coordinate so that distances between the reference coordinates and the corrected coordinates become equal to each other; and
   an update unit configured to calculate using the corrected coordinates new conversion coefficients for the conversion unit, and to update the new conversion coefficients as conversion coefficients to be used by the conversion unit in subsequent touch position detection of the touch panel,
   wherein the correction unit corrects the coordinates converted by the conversion unit, using an average value of differences that are obtained by extending one or more differences satisfying a predetermined condition from the differences calculated by the calculation unit, and
   wherein the correction unit corrects the coordinates converted by the conversion unit, using an average value of differences except for at least a maximum difference of the differences calculated by the calculation unit.

2. The apparatus according to claim 1, wherein the coordinates on the display panel are X-Y coordinates having the reference coordinates as an origin, and
   the correction unit calculates average values of X-components and Y-components of the differences in consideration of whether the coordinates converted by the conversion unit have a direction to approach the origin or a direction to be away from the origin with respect to the display coordinates of the plurality of target touch marks, and corrects, using the average values, the coordinates converted by the conversion unit to generate the corrected coordinates so that distances between the reference coordinates and the corrected coordinates become equal to each other.

3. A storage medium storing a program for making a computer function as respective units of an information processing apparatus according to claim 1.

4. An information processing apparatus, which updates conversion coefficients required to correct displacements between display coordinates of a plurality of target touch marks and a plurality of touch detected coordinates on a touch panel, each touch detected coordinate corresponding to a different target touch mark and resulting from making a user touch the corresponding target touch mark displayed on a display panel via the touch panel, the apparatus comprising:

a display control unit configured to control to display the target touch marks at a plurality of coordinates having equal distances from reference coordinates with reference to a center of a display range on the display panel;

a conversion unit configured to convert the plurality of touch detected coordinates each corresponding to a different one of the plurality of target touch marks into converted coordinates on the display panel using predetermined conversion coefficients, each converted coordinate corresponding to a different one of the plurality of target touch marks;

a calculation unit configured to calculate for each of the display coordinates of the plurality of touch marks a difference between the display coordinate of that target touch mark and the converted coordinate corresponding to the same touch mark;

a correction unit configured to calculate an average value with reference to the center of the display range from at least a plurality of the differences calculated by the calculation unit, and to correct, using the average value, each of the converted coordinates to generate for each converted coordinate a corrected coordinate so that distances between the reference coordinates and the corrected coordinates become equal to each other; and an update unit configured to calculate using the corrected coordinates new conversion coefficients for the conversion unit, and to update the new conversion coefficients as conversion coefficients to be used by the conversion unit in subsequent touch position detection of the touch panel, wherein the correction unit corrects the coordinates converted by the conversion unit, using an average value of differences that are obtained by extending one or more differences satisfying a predetermined condition from the differences calculated by the calculation unit, and wherein the correction unit corrects the coordinates converted by the conversion unit, using an average value of differences except for a difference larger than a predetermined threshold of the differences calculated by the calculation unit.

5. The apparatus according to claim 4, wherein the coordinates on the display panel are X-Y coordinates having the reference coordinates as an origin, and the correction unit calculates average values of X-components and Y-components of the differences in consideration of whether the coordinates converted by the conversion unit have a direction to approach the origin or a direction to be away from the origin with respect to the display coordinates of the plurality of target touch marks, and corrects, using the average values, the coordinates converted by the conversion unit to generate the corrected coordinates so that distances between the reference coordinates and the corrected coordinates become equal to each other.

6. A non-transitory computer readable storage medium for storing a program for making a computer function as respective units of an information processing apparatus according to claim 4.

7. An information processing apparatus, which updates conversion coefficients required to correct displacements between display coordinates of a plurality of target touch marks and a plurality of touch detected coordinates on a touch panel, each touch detected coordinate corresponding to a different target touch mark and resulting from making a user touch the corresponding target touch mark displayed on a display panel via the touch panel, the apparatus comprising:

a display control unit configured to control to display the target touch marks at a plurality of coordinates having equal distances from reference coordinates with reference to a center of a display range on the display panel;

a conversion unit configured to convert the plurality of touch detected coordinates each corresponding to a different one of the plurality of target touch marks into converted coordinates on the display panel using predetermined conversion coefficients, each converted coordinate corresponding to a different one of the plurality of target touch marks;

a calculation unit configured to calculate for each of the display coordinates of the plurality of touch marks a difference between the display coordinate of that target touch mark and the converted coordinate corresponding to the same touch mark;

a correction unit configured to calculate an average value with reference to the center of the display range from at least a plurality of the differences calculated by the calculation unit, and to correct, using the average value, each of the converted coordinates to generate for each converted coordinate a corrected coordinate so that distances between the reference coordinates and the corrected coordinates become equal to each other; and an update unit configured to calculate using the corrected coordinates new conversion coefficients for the conversion unit, and to update the new conversion coefficients as conversion coefficients to be used by the conversion unit in subsequent touch position detection of the touch panel, wherein the correction unit corrects the coordinates converted by the conversion unit, using an average value of differences that are obtained by extending one or more differences satisfying a predetermined condition from the differences calculated by the calculation unit, and wherein the correction unit corrects the coordinates converted by the conversion unit, using an average value of differences except for a difference, whose difference from the average value of the differences is larger than a predetermined threshold, of the differences calculated by the calculation unit.

8. The apparatus according to claim 7, wherein the coordinates on the display panel are X-Y coordinates having the reference coordinates as an origin, and the correction unit calculates average values of X-components and Y-components of the differences in consideration of whether the coordinates converted by the conversion unit have a direction to approach the origin or a direction to be away from the origin with respect to the display coordinates of the plurality of target touch marks, and corrects, using the average values, the coordinates converted by the conversion unit to generate the corrected coordinates so that distances between the reference coordinates and the corrected coordinates become equal to each other.

9. A non-transitory computer readable storage medium for storing a program for making a computer function as respective units of an information processing apparatus according to claim 7.

10. A control method of an information processing apparatus, which updates conversion coefficients required to correct displacements between display coordinates of a plurality of target touch marks and touch detected coordinates on a touch panel, each touch detected coordinate corresponding to a different target touch mark and resulting from making a user touch the corresponding target touch mark displayed on a display panel via the touch panel, the method comprising:

a display control step of controlling a display control unit of the information processing apparatus to control to display the target touch marks at a plurality of coordinates having equal distances from reference coordinates with reference to a center of a display range on the display panel;

a conversion step of controlling a conversion unit of the information processing apparatus to convert the plurality of touch detected coordinates each corresponding to a different one of the plurality of target touch marks into converted coordinates on the display panel using predetermined conversion coefficients, each converted coordinate corresponding to a different one of the plurality of target touch marks;

a calculation step of controlling a calculation unit of the information processing apparatus to calculate for each of the display coordinates of the plurality of touch marks a difference between the display coordinate of that target touch mark and the converted coordinate corresponding to the same touch mark;

a correction step of controlling a correction unit of the information processing apparatus to correct, using an average value of the differences calculated in the calculation step, each of the converted coordinates to generate for each converted coordinate a corrected coordinate so that distances between the reference coordinates and the corrected coordinates become equal to each other; and     an update step of controlling an update unit of the information processing apparatus to calculate using the corrected coordinates new conversion coefficients for the conversion step, and to update the new conversion coefficients as conversion coefficients to be used in the conversion step in subsequent touch position detection of the touch panel,     wherein the correction step corrects the coordinates converted by the conversion step, using an average value of differences that are obtained by extending one or more differences satisfying a predetermined condition from the differences calculated by the calculation step, and     wherein the correction step corrects the coordinates converted by the conversion step, using an average value of differences except for at least a maximum difference of the differences calculated by the calculation step.

11. A control method of an information processing apparatus, which updates conversion coefficients required to correct displacements between display coordinates of a plurality of target touch marks and touch detected coordinates on a touch panel, each touch detected coordinate corresponding to a different target touch mark and resulting from making a user touch the corresponding target touch mark displayed on a display panel via the touch panel, the method comprising:

a display control step of controlling a display control unit of the information processing apparatus to control to display the target touch marks at a plurality of coordinates having equal distances from reference coordinates with reference to a center of a display range on the display panel;

a conversion step of controlling a conversion unit of the information processing apparatus to convert the plurality of touch detected coordinates each corresponding to a different one of the plurality of target touch marks into converted coordinates on the display panel using predetermined conversion coefficients, each converted coordinate corresponding to a different one of the plurality of target touch marks;

a calculation step of controlling a calculation unit of the information processing apparatus to calculate for each of the display coordinates of the plurality of touch marks a difference between the display coordinate of that target touch mark and the converted coordinate corresponding to the same touch mark;

a correction step of controlling a correction unit of the information processing apparatus to correct, using an average value of the differences calculated in the calculation step, each of the converted coordinates to generate for each converted coordinate a corrected coordinate so that distances between the reference coordinates and the corrected coordinates become equal to each other; and     an update step of controlling an update unit of the information processing apparatus to calculate using the corrected coordinates new conversion coefficients for the conversion step, and to update the new conversion coefficients as conversion coefficients to be used in the conversion step in subsequent touch position detection of the touch panel,     wherein the correction step corrects the coordinates converted by the conversion step, using an average value of differences that are obtained by extending one or more differences satisfying a predetermined condition from the differences calculated by the calculation step, and     wherein the correction step corrects the coordinates converted by the conversion step, using an average value of differences except for a difference larger than a predetermined threshold of the differences calculated by the calculation step.

12. A control method of an information processing apparatus, which updates conversion coefficients required to correct displacements between display coordinates of a plurality of target touch marks and touch detected coordinates on a touch panel, each touch detected coordinate corresponding to a different target touch mark and resulting from making a user touch the corresponding target touch mark displayed on a display panel via the touch panel, the method comprising:

a display control step of controlling a display control unit of the information processing apparatus to control to display the target touch marks at a plurality of coordinates having equal distances from reference coordinates with reference to a center of a display range on the display panel;

a conversion step of controlling a conversion unit of the information processing apparatus to convert the plurality of touch detected coordinates each corresponding to a different one of the plurality of target touch marks into converted coordinates on the display panel using predetermined conversion coefficients, each converted coordinate corresponding to a different one of the plurality of target touch marks;

a calculation step of controlling a calculation unit of the information processing apparatus to calculate for each of the display coordinates of the plurality of touch marks a difference between the display coordinate of that target touch mark and the converted coordinate corresponding to the same touch mark;

a correction step of controlling a correction unit of the information processing apparatus to correct, using an average value of the differences calculated in the calculation step, each of the converted coordinates to generate for each converted coordinate a corrected coordinate so that distances between the reference coordinates and the corrected coordinates become equal to each other; and an update step of controlling an update unit of the information processing apparatus to calculate using the corrected coordinates new conversion coefficients for the conversion step, and to update the new conversion coefficients as conversion coefficients to be used in the conversion step in subsequent touch position detection of the touch panel, wherein the correction step corrects the coordinates converted by the conversion step, using an average value of differences that are obtained by extending one or more differences satisfying a predetermined condition from the differences calculated by the calculation step, and wherein the correction step corrects the coordinates converted by the conversion step, using an average value of differences except for a difference, whose difference from the average value of the differences is larger than a predetermined threshold, of the differences calculated by the calculation step.

* * * * *